Dec. 28, 1954 C. R. CANALIZO 2,698,024
TUBING FLUID PRESSURE CONTROLLED GAS
LIFT VALVE WITH FRICTION SEAL
Filed Jan. 24, 1952 4 Sheets-Sheet 2
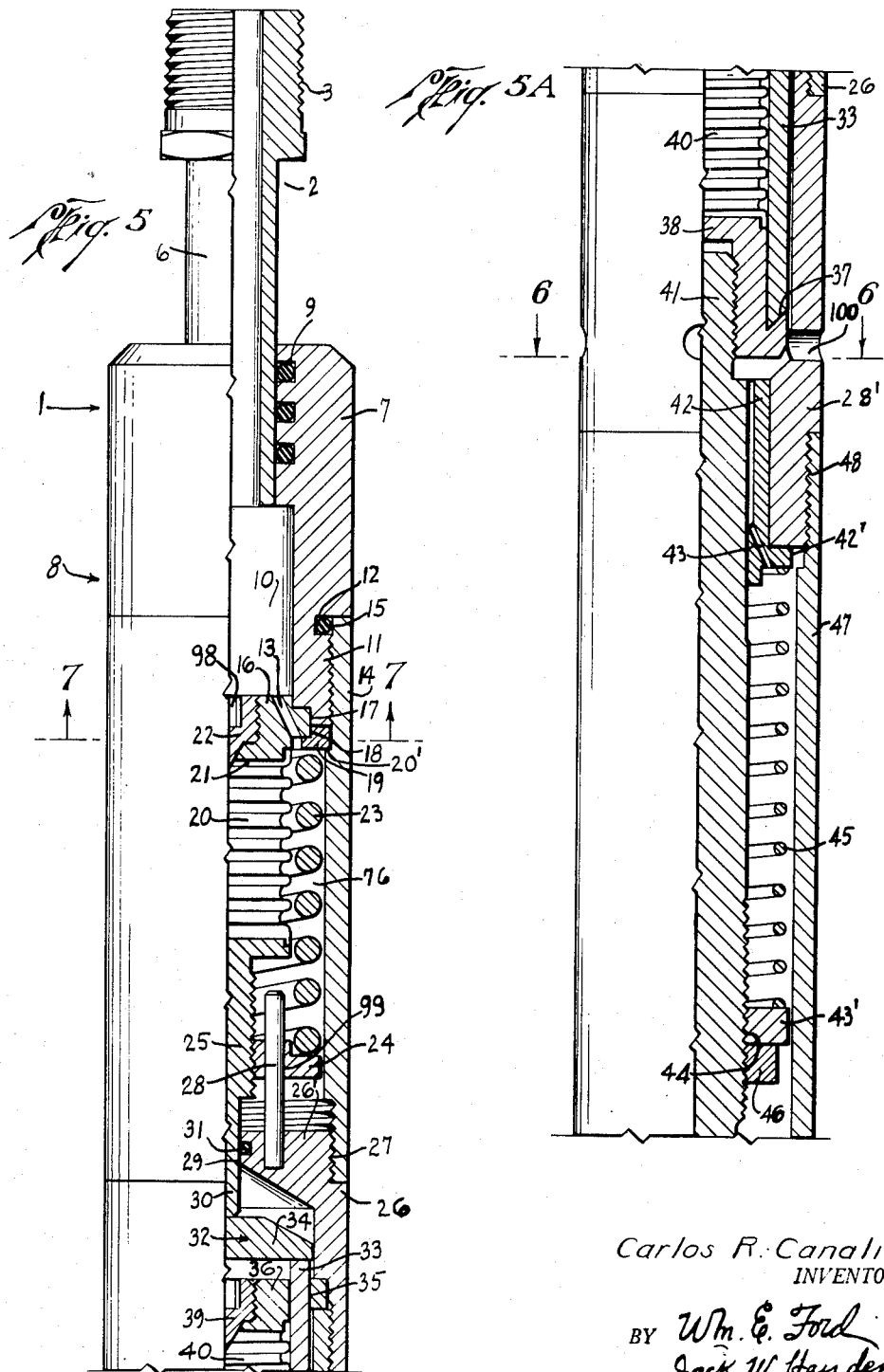
Carlos R. Canalizo
INVENTOR.
BY Wm. E. Ford +
Jack W. Hayden
ATTORNEYS

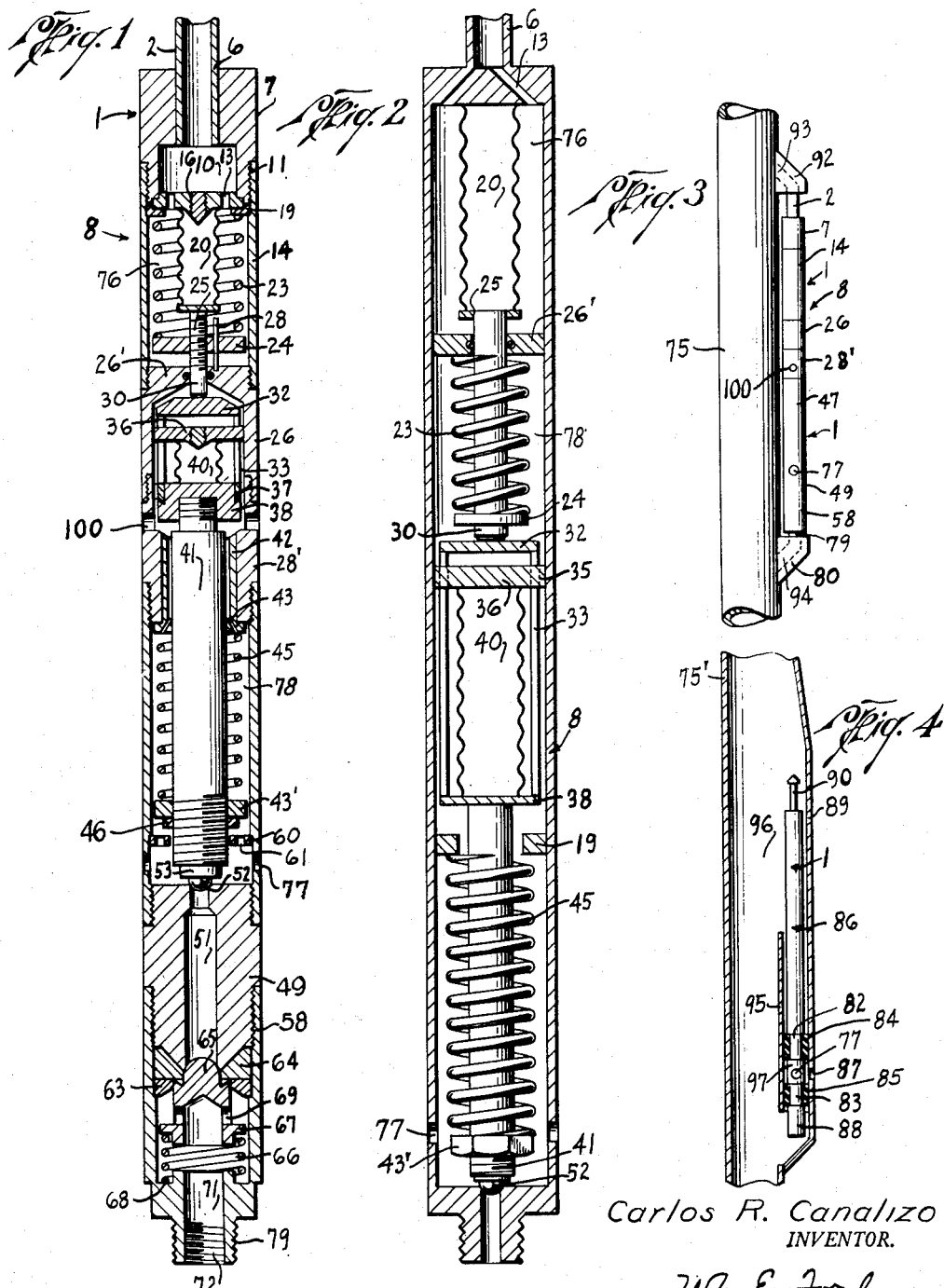

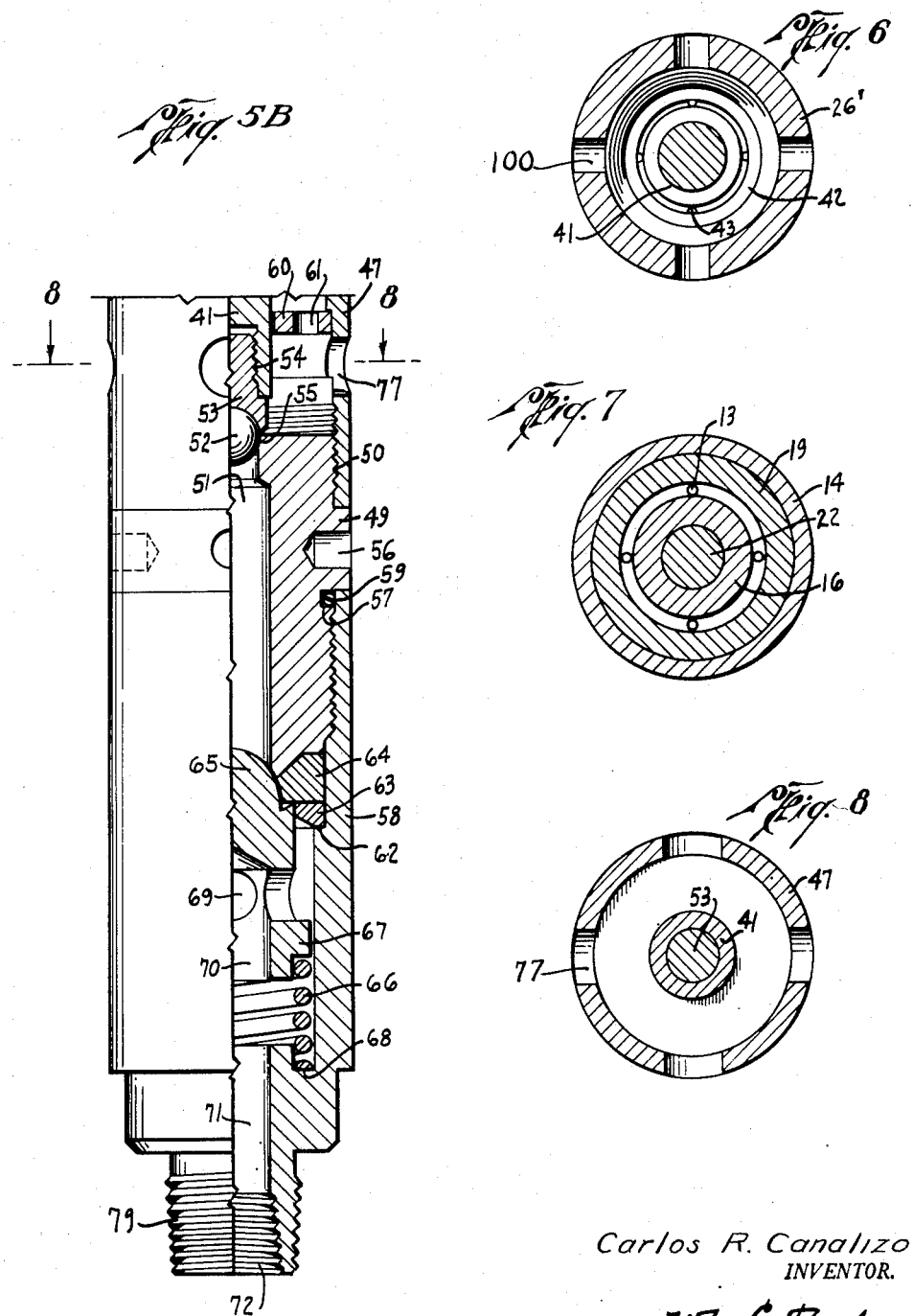

Dec. 28, 1954     C. R. CANALIZO     2,698,024
TUBING FLUID PRESSURE CONTROLLED GAS
LIFT VALVE WITH FRICTION SEAL
Filed Jan. 24, 1952     4 Sheets-Sheet 4

INVENTOR
Carlos R. Canalizo.
BY Wm. E. Ford
ATTORNEY

United States Patent Office 2,698,024
Patented Dec. 28, 1954

2,698,024

TUBING FLUID PRESSURE CONTROLLED GAS LIFT VALVE WITH FRICTION SEAL

Carlos R. Canalizo, Houston, Tex., assignor to Camco, Incorporated, Houston, Tex., a corporation of Texas Application January 24, 1952, Serial No. 268,053

14 Claims. (Cl. 137—155)

This invention relates to a gas lift valve in which a primary yieldably urging means acts to extend a primary bellows and to urge a valve closed, while a secondary yieldably urging means acts to extend a secondary bellows and to assist the primary yieldably urging means to urge the valve closed until a pressure fluid acts to contract the second bellows and disengage its assistance in closing the valve whereby a separate pressure fluid may contact the primary fluid and open the valve.

It is an object of this invention to provide a gas lift valve to subject two separate bellows each to the contractive force of separate pressure fluids and against the respective urging of two separate yieldably urging means which act additively to hold a valve closed until one pressure fluid contracts its respective bellows to withdraw the additive force of its respective yieldably urging means so that the other pressure fluid may contract its respective bellows and lift the valve.

It is another object of this invention to provide a gas lift valve which may be installed on or in a tubing string, and which will not admit gas into the tubing until the pressure fluid to be lifted in the tubing exceeds a pre-determined hydrostatic head above the gas lift valve.

It is a further object of this invention to provide a gas lift valve of this class which acts to save the gas employed to lift the fluid in the tubing by admitting the gas into the tubing only when there is ready to be lifted a predetermined hydrostatic head of fluid standing in the tubing above the valve.

It is yet another object of this invention to provide a valve of this class which is not only operative as a gas lift valve, but which may operate to leave a valve subject to the opening pressure of one fluid at such time when another pressure fluid may exceed, and withdraw an additional force which has been assisting in maintaining the valve closed.

Other and further objects will be apparent when the specification is considered in connection with the drawings in which:

Fig. 1 is a sectional elevation of one modification of gas lift valve.

Fig. 2 is a sectional elevation of another modification of gas lift valve.

Fig. 3 shows a gas lift valve installed on the exterior of a tubing mandrel.

Fig. 4 shows a gas lift valve installed on the interior of a tubing mandrel.

Fig. 5 is an enlarged sectional elevation of the upper portion of the valve shown in Fig. 1.

Fig. 5A is an enlarged sectional elevation of the central portion of the valve shown in Fig. 1.

Fig. 5B is an enlarged sectional elevation of the lower portion of the valve shown in Fig. 1.

Fig. 6 is a sectional plan view taken along line 6—6 of Fig. 5A.

Fig. 7 is a sectional bottom view taken along line 7—7 of Fig. 5.

Fig. 8 is a sectional plan view taken along line 8—8 of Fig. 5B.

Figure 9:
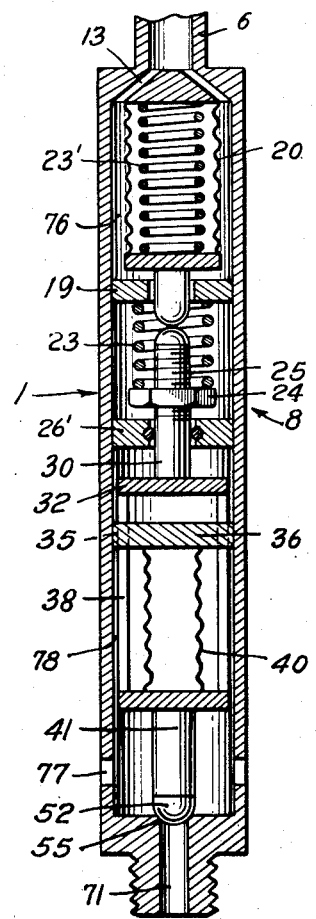
Fig. 9 is a sectional elevation showing still another modification of gas lift valve.

As shown in Figs. 1, 3, and 5, the top portion of the valve 1 has a tubular head 2 threaded at 3 for engagement with the boss 92 on the tubing mandrel 75, and which has a reduced diameter portion 6 which is slidable into the top part 7 of the valve body 8. The portion 6 is slidable against the seal rings 9 in the top 7 and can be forced downwardly into the cavity 10 and then moved back upwardly as the threaded section 3 of the head 2 is engaged in the boss 4.

The top part 7 has the threaded end 11 with the groove 12 therein, shown in Fig. 5, so that when the upper sleeve 14 is threaded up thereon the seal 15 is compressed to seal between the engaged elements. The bellows cap 16 fits in the top recess 17 and in the recess 18 in the spring retaining ring 19 so that when the shoulder 20′ of the sleeve bears against the ring 19 when threaded upon the top 7, the top, cap, ring, and sleeve are in assembled engagement. Ports 13 in the cap 16 permit fluid to pass therethrough.

The secondary bellows 20 is connected to the cap 16 by a leak-proof sealing means 21, and the cap 16 has the fitting 22 therein through which a fluid, as a gas, may be injected to fill, or at least partially fill the bellows as may be desired.

A spring 23 surrounds the bellows 20, and bears upwardly on the ring 19 and downwardly on the adjustment nut 24, which is threaded upon the bellows shaft 25 to set the spring to exert a pre-determined force, as 300 pounds.

The tubular connector member 26 has a closed upper end to form the partition 26′ when the sleeve 14 and the connector 26 are in threaded engagement at 27. The stop pin 28 is pressed into the top of the partition and upstands thereabove to limit the extension of the secondary bellows 20 and to extend through the opening 99 in the nut 24 to prevent it from turning when a lug wrench may be inserted into the non-circular cavity 98 to rotate the bellows 20 and threaded shaft 25 to move the nut 24 axially to adjust the tension of spring 23. The shaft portion 30 of the bellows shaft 25 extends through the opening 29 and is slidable against the seal ring 31 in the partition.

The cage 32 fits within the connector 26 and the radially spaced prongs 33 extend from the cage head 34 through openings 35 in the primary bellows cap 36, and these prongs seat in the groove 37 in the base member 38 of the primary bellows 40. A fitting 39 is provided in the bellows cap 36 through which a fluid, as a gas, may be injected to fill, or at least partially fill the bellows as may be desired.

The base member 38 is internally threaded at its lower end to receive the upper end of the stem 41 and the ring 42, having the ports 43 therein, is slidable over the stem 41 so that the flange 42′ thereof may shoulder against the lower end of the connector 28′ when the adjustment nut 43′ is threaded at 44 onto the stem 41 to confine the spring 45 around the stem 41 and between the nut 43′ and flange 42′ to exert a predetermined downward force, as 600 pounds. Below the adjustment nut 43, the lock nut 46 is threaded on the stem at 44 to bear against and lock the adjustment nut in a desired position.

The lower sleeve 47 shown in Figs. 5A and 5B is threadable onto the connector 28′ at 48 and has the valve body 49 shown in Fig. 5B threaded thereinto at 50, such body having the flow passage or port 51 therethrough to be controlled by the ball valve 52 which is rigidly connected to the bushing 53 threadable at 54 into the lower end of the stem 41. Thus when not opposed the spring 45 will force the ball valve 52 upon the seat 55 to close the port 5.

The holes 56 are provided in the valve body so that a socket wrench may be inserted to adjust the valve body 49 with relation to the lower sleeve 47. The groove 57 is provided in the valve body 49 so that a fluid seal is provided when the tubular base 58 is threaded onto the valve body 49 to compress the seal ring 59. The guide ring 60 with ports 61 therethrough is provided to guide the stem 41 in seating the ball valve 52.

The base 58 has the shoulder 62 therein to force the retaining ring 63 against the valve seat 64 for the check valve 65. The spring 66 bears upwardly against the flange 67 on this check valve and seats downwardly in the groove 68 in the base and forces the check valve 65 against the seat 64.

The check valve 65 has the ports 69 therein leading into the passage 70, and the interior 71 of the base 58 communicates with the outlet passage 72. As shown in Fig. 3, the threaded end member 79 is engageable with the boss 80 on the tubing mandrel to complete the connection of the flow valve 1 to the tubing mandrel 75.

In operation, with the valve 1 installed on the tubing mandrel 75 as shown in Fig. 3, the fluid, as oil, encountered in the tubing, passes through the tubular head 2, and through the ports 13 into the secondary compartment 76 to compress the secondary bellows 20.

As long as the compressive force of this fluid does not overcome the pre-determined force exerted by the secondary spring 23, the bellows shaft 25 presses against the cage head 34 and adds to the valve closing force of the primary spring 45 that portion of the force of the spring 23 not neutralized by the pressure of the fluid from the tubing.

Finally when the pressure of the fluid from the tubing neutralizes the force of the secondary spring 23 and contracts the primary bellows, contact between the shaft 25 and the cage head 34 is disengaged, and the force of the primary spring 45 above alone forces the valve 52 closed.

Then, since the primary spring 45 has been adjusted to exert a predetermined force to close the valve, when the pressure of the fluid, as gas, which has entered the port 77 to pass upwardly through the ports 43 of the ring 42, and to pass further upwardly between the prongs 33 and against the bellows 40, builds up to exceed the force of the spring 45, and to compress the bellows 40, the fluid pressure in the compartment 78 lifts the valve 52 from the seat 55 so that the fluid passes outwardly through the port 5 and through the check valve 65, and as shown in Fig. 3, on through the boss 80 into which the end 79 has been threaded and thence into the mandrel 75 to lift the pressure fluid in the tubing string at a time when it stands substantially above the position of the valve 1 on such tubing string.

As shown in Fig. 2, it is not necessary to have the spring 23 in the secondary compartment 76 above the partition 26'. Rather this spring 23, when working against the compression of the secondary bellows 20, may be located below the partition 26' in the primary compartment 78, and the same results obtained.

Figure 10:
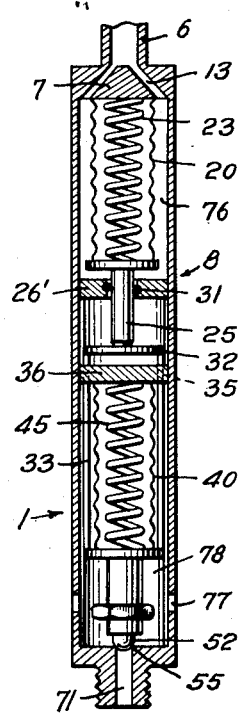
Fig. 10 is a sectional elevation showing yet a further modification of gas lift valve.

It is also possible to obtain these same results as shown in Fig. 10 by providing a spring 23, as shown in Fig. 2, within the bellows 20 to bear at its lower end against the top of the bellows shaft 25, and its upper end against the top part 7 of the valve body 8. As shown in Fig. 9 it can be seen that the shaft portion corresponding to shaft portion 30, as shown in Fig. 5, could be rigidly fixed to the cage, while the portion 25 could be severed above the adjustment nut 24, so that the spring 23, although in the compartment 76, would bear upwardly on the ring 19 and downwardly on the nut 24 and directly urge the stem 41 to close the valve. In such case a separate spring 23' could be provided within the bellows 20 as described hereinabove.

In order to insure that the primary fluid may always have access to the primary compartment 76 and bellows 40, additional ports 100, as shown in Figs. 1, 5, 5A, and 6, may be provided, as, for instance, in case ports 77 may be occluded through inadvertence.

It is also pointed out that the spring 45 could be installed in the bellows 40 as well as in the positions shown, so that one end would bear against the cap 36, and the other end against the base 38.

As regards the bellows 20 and 40, it has been found that it is best to at least partially fill them with a gas, or an inert fluid with an exceedingly high boiling point to prevent collapsing the bellows under extreme pressures. The substance now used for this purpose is a chemical termed Dowtherm E which has a boiling point of approximately 495° F.

Any form of this invention may be installed, as shown in Fig. 3, on the exterior of a tubing mandrel 75. This is accomplished by threading the end 79 of the base 58 into the boss 80 while the portion 6 of the head 2 is inserted into the cavity 10, after which the head 2 is moved upwardly and the threaded portion 3 thereof threaded into the upper boss 92. Thus the tubing fluid may pass outwardly through the passage 93 into the tubular head 2, and into the secondary compartment. Also the primary fluid, as gas, may pass in to the primary compartment through the port 77 and downwardly through the tubular pass 58 into the passage 94 which leads through the boss 80 into the tubing mandrel 75.

As shown in Fig. 4, a flow valve 1, constructed after the design of any of the modifications described hereinabove, may be installed within a tubing mandrel 75' which has the enlargement 89 thereon, and which has a sleeve 95 within the bore 96 of the mandrel and attached to such enlarged portion 89. In such case the body 86 of the valve, must have the reduced diameter portions 82 and 83 thereon spaced on either side of the portion 97, so that the seals 84 and 85, respectively, may be installed therearound to seal off the portion 97 from the mandrel bore 96. Then the primary fluid, as the gas, which is inserted into the annulus surrounding the tubing string within the well bore, may enter the port 87 in the mandrel 75' and pass into the primary compartment of the valve through the port 77 in the sealed off portion 97. Thus, when the valve is open, this primary fluid may pass into the mandrel bore 96 through the base or end 88.

It can be seen with this arrangement that the bellows 20 and its shaft 30 act as a pilot for the bellows 40 and valve 52. Thus, the pilot assures that the valve 52 remains closed until the hydrostatic head of fluid in the tubing string containing the mandrel 75 or 75' must stand substantially above the valve 1. Thus gas is admitted into the mandrel 75 and tubing string attached thereto only at such time as when there is a quantity of fluid above the valve 1 to be lifted by the gas. With this arrangement it is assured that gas is not wasted but is employed in the tubing string only at a time when it will do the most effective work toward lifting fluid, as oil, to the top of the well.

Broadly this invention considers a flow valve in which the force of two separate yieldably urging means acts additively to maintain a valve closed against the pressure of two separate fluids, each acting to counteract the force of one of the two yieldably urging means; the yieldably urging means being disengageable upon one pressure fluid obtaining a pre-determined flow whereby the other pressure fluid may act against its yieldably urging means to open the valve.

What is claimed is:

1. In a flow valve, the combination of, a hollow housing having a partition therein to provide a primary and secondary compartment, a primary and secondary bellows respectively in said compartments with ends fixed toward the secondary compartment end of said housing and movable ends extending toward the primary compartment end of said housing, a fluid outlet port in said primary compartment end of said housing, valve means connected to said primary bellows movable end to close said outlet port, a first yieldably urging means in said primary compartment to urge said valve to close said outlet port, shaft means connected to said secondary bellows movable end and sealably slidable through said partition, a second yieldably urging means to yieldably urge said shaft means toward said primary bellows, means connected to said valve means and adapted to be abutted by said shaft means to add the yieldably urging force of said second yieldably urging means to the force of said first yieldably urging means in urging said valve means closed, a first inlet port to admit a first pressure fluid into said primary compartment to compress said primary bellows against the urging of said first yieldably urging means and a second inlet port to admit a second pressure fluid into said secondary compartment to compress said secondary yieldably urging means to withdraw said shaft means toward said secondary bellows to permit said first pressure fluid to open said valve.

2. In a flow valve, the combination of, a hollow housing having a partition therein to divide said housing into two compartments, a bellows in each compartment, two separate pressure fluids, one admissible into each compartment to compress the bellows therein, a fluid outlet from one compartment and a valve means movably connected to the bellows in said one compartment to control said outlet port, and a separate yieldably urging means for each bellows to resist the compression thereof and adapted to additively urge said valve means closed, the force of the yieldably urging means in the other compartment being disengageable from abetting the other yieldably urging means by the operation of the pressure fluid in said other compartment whereby said other pressure fluid may compress the bellows in said one compartment to open said valve means.

3. In a flow valve, the combination of, a hollow housing having a partition therein to divide said housing into two compartments, a bellows in each compartment, two separate pressure fluids, one admissible into each compartment to compress the bellows therein, a fluid outlet from one compartment and a valve means movably connected to the bellows in said one compartment to control said outlet port, and a separate yieldably urging means for each bellows to resist the compression thereof and adapted to additively urge said valve means closed, the force of the yieldably urging means in the other compartment being disengageable from abetting the other yieldably urging means by the operation of the pressure fluid in said other compartment whereby said other pressure fluid may compress the bellows in said one compartment to open said valve means, each yieldably urging means being located in the compartment with the bellows against which it acts.

4. In a flow valve, the combination of a hollow housing having a partition therein to divide said housing into two compartments, a bellows in each compartment, two separate pressure fluids, one admissible into each compartment to compress the bellows therein, a fluid outlet from one compartment and a valve means movably connected to the bellows in said one compartment to control said outlet port, and a separate yieldably urging means for each bellows to resist the compression thereof and adapted to additively urge said valve means closed, the force of the yieldably urging means in the other compartment being disengageable from abetting the other yieldably urging means by the operation of the pressure fluid in said other compartment whereby said other pressure fluid may compress the bellows in said one compartment to open said valve means, each yieldably urging means being located in said one compartment.

5. In a flow valve, the combination of, a hollow housing having a partition therein to divide said housing into two compartments, a bellows in each compartment, two separate pressure fluids, one admissible into each compartment to compress the bellows therein, a fluid outlet from one compartment and a valve means movably connected to the bellows in said one compartment to control said outlet port, and a separate yieldably urging means for each bellows to resist the compression thereof and adapted to additively urge said valve means closed, the force of the yieldably urging means in the other compartment being disengageable from abetting the other yieldably urging means by the operation of the pressure fluid in said other compartment whereby said other pressure fluid may compress the bellows in said one compartment to open said valve means, each yieldably urging means being located in said other compartment.

6. In a flow valve, the combination of, a hollow housing having a partition therein to divide said housing into two compartments, a bellows in each compartment, two separate pressure fluids, one admissible into each compartment to compress the bellows therein, a fluid outlet from one compartment and a valve means movably connected to the bellows in said one compartment to control said outlet port, and a separate yieldably urging means for each bellows to resist the compression thereof and adapted to additively urge said valve means closed, the force of the yieldably urging means in the other compartment being disengageable from abetting the other yieldably urging means by the operation of the pressure fluid in said other compartment whereby said other pressure fluid may compress the bellows in said one compartment to open said valve means, the yieldably urging means for at least one of said bellows being located within such bellows.

7. In a flow valve, the combination of, a hollow housing having a partition therein to divide said housing into two compartments, a bellows in each compartment, two separate pressure fluids, one admissible into each compartment to compress the bellows therein, a fluid outlet from one compartment and a valve means movably connected to the bellows in said one compartment to control said outlet port, and a separate yieldably urging means for each bellows to resist the compression thereof and adapted to additively urge said valve means closed, the force of the yieldably urging means in the other compartment being disengageable from abetting the other yieldably urging means by the operation of the pressure fluid in said other compartment whereby said other pressure fluid may compress the bellows in said one compartment to open said valve means, said valve including a head having a portion sealably slidable within one compartment and adapted externally of said housing for threadable engagement.

8. In a flow valve, the combination of, a hollow housing having a partition therein to divide said housing into two compartments, a bellows in each compartment, two separate pressure fluids, one admissible into each compartment to compress the bellows therein, a fluid outlet from one compartment and a valve means movably connected to the bellows in said one compartment to control said outlet port, a yieldably urging means for each bellows to resist the compression thereof and adapted to additively urge said valve means closed, the force of the yieldably urging means in the other compartment being disengageable from abetting the other yieldably urging means by the operation of the pressure fluid in said other compartment whereby said other pressure fluid may compress the bellows in said one compartment to open said valve means, said housing including a tubular member connected to communicate with said outlet port on the opposite side thereof from said bellows and a check valve controlling the passage through said tubular member.

9. In a flow valve, the combination of, a hollow housing having a partition therein to divide said housing into two compartments, a bellows in each compartment, two separate pressure fluids, one admissible into each compartment to compress the bellows therein, a fluid outlet from one compartment and a valve means movably connected to the bellows in said one compartment to control said outlet port, and a separate yieldably urging means for each bellows to resist the compression thereof and adapted to additively urge said valve means closed, the force of the yieldably urging means in the other compartment being disengageable from abetting the other yieldably urging means by the operation of the pressure fluid in said other compartment whereby said other pressure fluid may compress the bellows in said one compartment to open said valve means, said valve including means at either end of said housing adapted to connect each housing end to a connection element when said elements are spaced apart a pre-determined fixed distance.

10. In a flow valve, the combination of, a hollow housing having a partition therein to divide said housing into two compartments, a bellows in each compartment, two separate pressure fluids, one admissible into each compartment to compress the bellows therein, a fluid outlet from one compartment and a valve means movably connected to the bellows in said one compartment to control said outlet port, and a separate yieldably urging means for each bellows to resist the compression thereof and adapted to additively urge said valve means closed, the force of the yieldably urging means in the other compartment being disengageable from abetting the other yieldably urging means by the operation of the pressure fluid in said other compartment whereby said other pressure fluid may compress the bellows in said one compartment to open said valve means, said housing having a sealing means thereon of larger outer diameter than said housing on either side of the fluid inlet into said one compartment, and a means at one end engageable to lift said housing.

11. In a flow valve, the combination of, a hollow housing having a partition therein to divide said housing into two compartments, a bellows in each compartment, two separate pressure fluids, one admissable into each compartment to compress the bellows therein, a fluid outlet from one compartment and a valve means movably connected to the bellows in said one compartment to control said outlet port, and a separate yieldably urging means for each bellows to resist the compression thereof and adapted to additively urge said valve means closed, the force of the yieldably urging means in the other compartment being disengageable from abetting the other yieldably urging means by the operation of the pressure fluid in said other compartment whereby said other pressure fluid may compress the bellows in said one compartment to open said valve means, at least one of said bellows being at least partially filled with fluid to resist the collapsing of said bellows under excessive pressure.

12. In a flow valve, a valve body having two compartments, a bellows device in each compartment, two separate pressure fluids admissible, one to one of the compartments and the other to the other compartment, a fluid outlet from one of the compartments, a valve movable with compression and distension of the bellows device in said one compartment to control said outlet, yieldably urging means operatively associated with each bellows device for distending the same in opposition to any compressive action thereon by pressure fluid and for additively urging said valve to closed position, the compression of the bellows device in said other compartment serving to remove its opposing yieldably urging means from abetting the yieldably urging means for the bellows device in the remaining compartment and thereby enable the valve to be opened at reduced fluid pressure, for pressure fluid flow therebeyond.

13. In a flow valve, the combination of, a hollow housing having a partition therein to divide said housing into two compartments, a bellows in each compartment, two separate pressure fluids, one admissible into each compartment to compress the bellows therein, a fluid outlet from one compartment and a valve means movably connected to the bellows in said one compartment to control said outlet port, and a separate yieldably urging means for each bellows to resist the compression thereof and adapted to additively urge said valve means closed, the force of the yieldably urging means acting upon the bellows in the other compartment being disengageable from abetting the other yieldably urging means by the operation of the pressure fluid in said other compartment whereby said other pressure fluid may compress the bellows in said one compartment to open said valve means.

14. A flow valve including a housing having a partition therein to divide said housing into compartments, said housing providing a flow passage in fluid communication with a first compartment, a valve stem in said housing having a valve element on one end thereof to control said flow passage, means in said housing tending to resiliently urge said valve stem toward valve closing position, said housing providing port means therein to admit a pressure fluid into a second compartment, means in said second compartment resiliently extensible in valve closing direction and compressible responsive to an increase in fluid pressure in said second compartment to be moved oppositely to valve closing direction, and force transmitting means extending sealably through said partition and effecting an operable connection between said resiliently extensible and compressible means and said valve stem to abet said resiliently urging means to close said valve until a predetermined fluid pressure attained in said second compartment compresses said resiliently extensible and compressible means to disengage said connection.

References Cited in the file of this patent

UNITED STATES PATENTS

| Number | Name | Date |
|---|---|---|
| 2,385,316 | Walton | Sept. 18, 1945 |